US012060156B2

(12) United States Patent
Clark et al.

(10) Patent No.: US 12,060,156 B2
(45) Date of Patent: *Aug. 13, 2024

(54) SYSTEMS AND METHODS FOR MAINTAINING ATTITUDE CONTROL UNDER DEGRADED ENERGY SOURCE CONDITIONS USING MULTIPLE PROPULSORS

(71) Applicant: BETA AIR, LLC, South Burlington, VT (US)

(72) Inventors: Kyle B. Clark, Underhill, VT (US); Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 514 days.

This patent is subject to a terminal disclaimer.

(21) Appl. No.: 17/347,919

(22) Filed: Jun. 15, 2021

(65) Prior Publication Data

US 2021/0309383 A1   Oct. 7, 2021

Related U.S. Application Data

(63) Continuation-in-part of application No. 16/363,711, filed on Mar. 25, 2019, now Pat. No. 11,254,219.

(51) Int. Cl.
*B64D 31/12* (2006.01)
*B64C 29/00* (2006.01)
(Continued)

(52) U.S. Cl.
CPC .......... *B64D 31/12* (2013.01); *B64C 29/0033* (2013.01); *B64D 27/24* (2013.01); *G05D 1/0005* (2013.01); *G05D 1/0808* (2013.01)

(58) Field of Classification Search
CPC .. B60L 15/2045; B60L 58/12; B60L 2200/10; B60L 2240/427; B60L 2240/42;
(Continued)

(56) References Cited

U.S. PATENT DOCUMENTS 8,576,530 B2   11/2013  Aronson et al.
9,397,502 B2   7/2016   Weir et al.
(Continued)

FOREIGN PATENT DOCUMENTS

CN    103963963 B    1/2016
CN    107074357 A    8/2017

OTHER PUBLICATIONS

Overview of Intelligent Power Controller Development for the Deep Space Gateway, Jan. 1, 2017.
(Continued)

*Primary Examiner* — Muhammad Shafi
(74) *Attorney, Agent, or Firm* — Lee & Hayes, P.C.

(57) ABSTRACT

A system for maintaining attitude control under degraded or depleted energy source conditions using multiple electric propulsors includes a plurality of propulsors, at least an energy source providing electric power to the plurality of propulsors and a vehicle controller communicatively coupled to each propulsor and configured to calculate initial power levels for the plurality of propulsors, the initial power levels including an initial power level for each propulsor, determine an energy output capacity of the least an energy source under load, calculate, by the vehicle controller, an aggregate potential demand of the plurality of propulsors as a function of the initial power levels, determine that electric potential is insufficient to match the aggregate potential demand, and for each initial power level generate a reduced power level, the reduced power level less than the initial
(Continued)

power level and direct a corresponding propulsor to consume electrical power at the reduced power level.

20 Claims, 9 Drawing Sheets

(51) Int. Cl.
 *B64D 27/24* (2006.01)
 *G05D 1/00* (2006.01)

(58) Field of Classification Search
 CPC .... B60L 3/12; B60L 2260/44; B60L 2220/42; B64D 31/00; B64D 27/24; B64C 29/0091; H04L 67/125
 USPC .......................................................... 701/4
 See application file for complete search history.

(56) References Cited

U.S. PATENT DOCUMENTS

| | | | |
|---|---|---|---|
| 10,005,560 B2 | 6/2018 | Vallart et al. | |
| 10,014,707 B2 | 7/2018 | Rideau et al. | |
| 10,106,268 B2 | 10/2018 | Rossotto | |
| 10,396,396 B2 | 8/2019 | Badding | |
| 10,707,435 B2 | 7/2020 | Speier | |
| 10,953,754 B1 | 3/2021 | Wiegman | |
| 2010/0305792 A1 | 12/2010 | Wilk et al. | |
| 2010/0312421 A1 | 12/2010 | Eglin | |
| 2011/0198918 A1 | 8/2011 | Langlois | |
| 2014/0125121 A1 | 5/2014 | Edwards | |
| 2016/0236790 A1* | 8/2016 | Knapp | B64C 11/001 |
| 2016/0280386 A1 | 9/2016 | Mestler et al. | |
| 2017/0260872 A1* | 9/2017 | Munevar | H02P 3/06 |

OTHER PUBLICATIONS

Overview of NASA Electrified Aircraft Propulsion Research for Large Subsonic Transports, Jan. 1, 2017.
PCT/US20/23337; International Search Report; Date: Jun. 26, 2020; By: Authorized Officer Lee Young.

* cited by examiner

SYSTEMS AND METHODS FOR MAINTAINING ATTITUDE CONTROL UNDER DEGRADED ENERGY SOURCE CONDITIONS USING MULTIPLE PROPULSORS

CROSS-REFERENCE TO RELATED APPLICATIONS

This application is a continuation-in-part of Non-provisional application Ser. No. 16/363,711, filed on Mar. 25, 2019 and issued as U.S. Pat. No. 11,254,219, which is entitled "SYSTEMS AND METHODS FOR MAINTAINING ATTITUDE CONTROL UNDER DEGRADED ENERGY SOURCE CONDITIONS USING MULTIPLE PROPULSORS," and the entirety of which is incorporated herein by reference.

FIELD OF THE INVENTION

The present invention generally relates to the field of electrically propelled vehicles. In particular, the present invention is directed to a system and method for maintaining attitude control under degraded or depleted energy source conditions using multiple propulsors.

BACKGROUND

In electric multi-propulsion systems such as electrified Vertical Take Off and Landing (eVTOL) aircraft, the propulsors are affected by the energy storage system's potential, particularly at low state of charge, when the energy storage becomes depleted, and when attempting to land in eVTOL mode. The attitude of the electrified aircraft becomes very difficult to control when the propulsors with the highest power commands (which are attempting to correct the aircraft's attitude) are being affected the most by the collapsing energy storage system potential. While the propulsors with the lowest power commands are able to follow their commands with fidelity. This asymmetrical response across the propulsors leads to poor attitude control and flight characteristics. This in turn can lead to unsafe or damaging conditions when attempting to land the craft at low state of charge. Existing approaches to mitigating this problem are limited. Normally, the safe operating range of a craft is reduced to ensure the energy storage device never has a power or terminal voltage limiting effect on the propulsors, which leads to oversized batteries, or short usable range restrictions, while keeping poor vehicle response and even crashes under lower states of charge possible if unexpected changes in flight plan or conditions requiring greater power consumption occur.

SUMMARY OF THE DISCLOSURE

In one aspect, a system for maintaining attitude control under degraded or depleted energy source conditions includes a plurality of propulsors, at least an energy source providing electric power to the plurality of propulsor, and a vehicle controller communicatively coupled to each propulsor of the plurality of propulsors, the vehicle controller designed and configured to determine commands for the plurality of propulsors, the commands include a command for each propulsor of the plurality of propulsors, calculate initial power levels for the plurality of propulsors as a function of the commands, the initial power levels including an initial power level for each propulsor of the plurality of propulsors, detect a present power output capability of the at least an energy source, determine that the present power output capability is insufficient to match the initial power levels, and for each initial power level of the plurality of initial power levels generate a reduced power level, the reduced power level less than the initial power level and direct a corresponding propulsor of the plurality of propulsors to consume electrical power at the reduced power level.

In another aspect, a method of maintaining attitude control of an electronic multi-propulsion system under degraded energy source conditions includes determining, by a vehicle controller communicatively connected to a plurality of propulsors powered by at least an energy source, commands for the plurality of propulsors, the commands including a command for each propulsor of the plurality of propulsors, calculating, by the vehicle controller, initial power levels for the plurality of propulsors as a function of the commands, the initial power levels including an initial power level for each propulsor of the plurality of propulsors, detecting, by the vehicle controller, a present power output capability of the at least an energy source, determining, by the vehicle controller, that the present power output capability is insufficient to match the initial power levels, and for each initial power level of the plurality of initial power levels generating, by the vehicle controller, a reduced power level, the reduced power level less than the initial power level and directing, by the vehicle controller, a corresponding propulsor of the plurality of propulsors to consume electrical power at the reduced power level.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the systems and methods disclosed herein may maintain attitude adjustment intentions of a flight controller or other vehicle controller for an electric multi-propulsion system such as an electrified aircraft by a novel process reducing the power commands to propulsors when an energy storage system powering the propulsors cannot support the original control signals due to power processing limitations. This novel method may result in a more controllable behavior from the electric multi-propulsion system than a non-selective control method which does not account for how the various propulsors will be affected by an energy storage system that has limited power capability. Systems and methods may maintain the relative magnitude of thrust between the propulsors by reducing the total power request by a minimal amount to provide as good fidelity as the depleted battery will allow; in an embodiment, this may permit an electric multi-propulsion system to perform emergency procedures such as emergency landings with minimal risk to losing attitude control of the vehicle.

Figure 1:
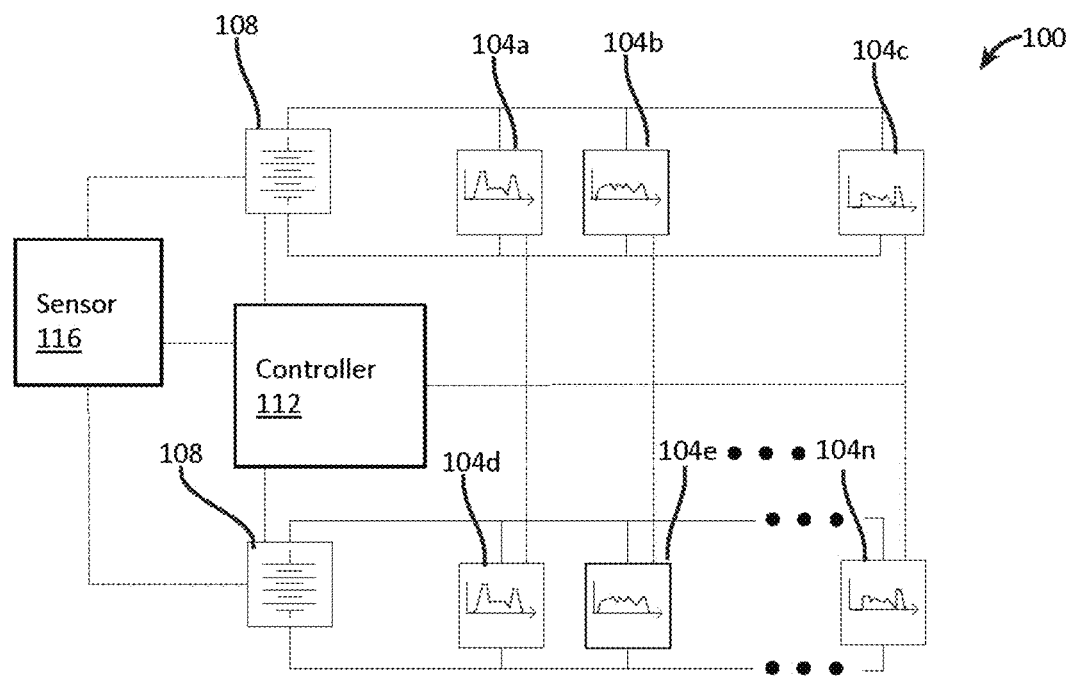
FIG. 1 is a block diagram depicting an exemplary embodiment of the disclosed system.

Referring now FIG. 1, an exemplary embodiment of a system 100 for maintaining attitude control under degraded energy source conditions using multiple electric propulsors is illustrated. System 100 may be or be incorporated in an electric multi-propulsion system, such as without limitation an electric aircraft, electric watercraft, or the like. System 100 includes a plurality of propulsors 104*a-n*. A propulsor, as used herein, is a component or device used to propel a craft by exerting force external to the craft; propulsor may include a fluid propulsor, which exerts force on a fluid medium, which may include a gaseous medium such as air or a liquid medium such as water. Alternatively or additionally, a propulsor may exert force on solid or other media, such as on a solid surface supporting craft; propulsor may, for instance, include a wheel or similar device for terrestrial locomotion. Plurality of propulsors 104*a-n* may include electric propulsors, which receive power in the form of electricity. Plurality of propulsors 104*a-n* may include any number of propulsors.

Figure 2:
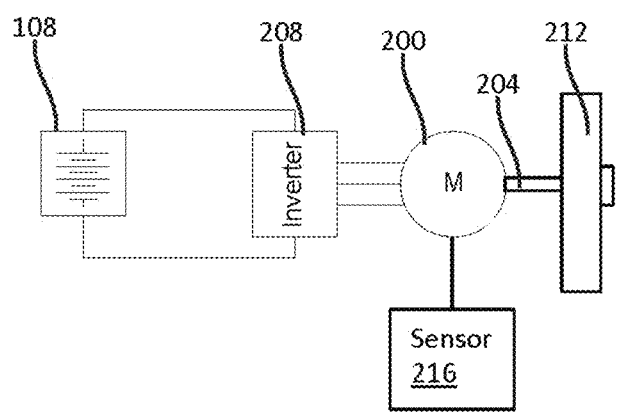
FIG. 2 is a block diagram depicting an exemplary embodiment of a propulsor.

Referring now to FIG. 2, an illustrative example of a propulsor 104*a*, which may include any propulsor of plurality of propulsors 104*a-n*, is illustrated. A propulsor 104*a* may include a motor 200. A motor 200 may include without limitation, any electric motor 200, where an electric motor 200 is a device that converts electrical energy into mechanical energy, for instance by causing a shaft 204 to rotate. A motor 200 may be driven by direct current (DC) electric power; for instance, a motor 200 may include a brushed DC motor 200 or the like. A motor 200 may be driven by electric power having varying or reversing voltage levels, such as alternating current (AC) power as produced by an alternating current generator and/or inverter 208, or otherwise varying power, such as produced by a switching power source. A motor 200 may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor 200 may take or exemplify as consistent with this disclosure. In addition to inverter 208 and/or switching power source, a circuit driving motor 200 may include electronic speed controllers (not shown) or other components for regulating motor 200 speed, rotation direction, torque, and/or dynamic braking. Motor 200 may include or be connected to one or more sensors 216 detecting one or more conditions of motor 200; one or more conditions may include, without limitation, voltage levels, electromotive force, current levels, temperature, current speed of rotation, position sensors, and the like. For instance, and without limitation, one or more sensors 216 may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor 200 to a system 100 or a computing device; computing device may include any computing device as described below in reference to FIG. 8, including without limitation a vehicle controller 112 as set forth in further detail below. Computing device may use sensor feedback to calculate performance parameters of motor 200, including without limitation a torque versus speed operation envelope. Persons skilled in the art, upon reviewing the entirety of this disclosure, will be aware of various devices and/or components that may be used as or included in a motor 200 or a circuit operating a motor 200, as used and described herein. In an embodiment, propulsors may receive differential power consumption commands, such as a propeller or the like receiving command to generate greater power output owing a greater needed contribution to attitude control, or a wheel receiving a greater power output due to worse traction than another wheel under slippery conditions.

With continued reference to FIG. 2, motor 200 may be connected to a thrust element 212. Thrust element 212 may include any device or component that converts the mechanical energy of the motor 200, for instance in the form of rotational motion of a shaft 204, into thrust in a fluid medium. Thrust element 212 may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element 212 may include without limitation a marine propeller or screw, an impeller, a turbine, a pump-jet, a paddle or paddle-based device, or the like. Thrust element 212 may include a rotor. Persons skilled in the art, upon reviewing the entirety of this disclosure, will be aware of various devices that may be used as thrust element 212.

Referring again to FIG. 1, system 100 may include at least an energy source 108. At least an energy source 108 may include any device providing energy to plurality of propulsors 104*a-n*; in an embodiment, at least an energy source 108 provides electric energy to the plurality of propulsors 104*a-n*. At least an energy source 108 may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor and/or inductor. At least an energy source 108 and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. Battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as at least an energy source 108.

Continuing to view FIG. 1, configuration of at least an energy source 108 containing connected modules may be designed to meet an energy or power requirement and may be designed to fit within a designated footprint in an electric aircraft in which system 100 may be incorporated. At least an energy source 108 may be used to provide a steady supply of electrical power to a load over the course of a flight by a vehicle or other electric aircraft; the at least an energy source 108 may be capable of providing sufficient power for "cruising" and other relatively low-energy phases of flight. At least an energy source 108 may be capable of providing electrical power for some higher-power phases of flight as well, particularly when the at least an energy source 108 is at a high state of charge and/or state of voltage, as may be the case for instance during takeoff. At least an energy source 108 may be capable of providing sufficient electrical power for auxiliary loads including without limitation, lighting, navigation, communications, de-icing, steering or other systems requiring power or energy. At least an energy source 108 may be capable of providing sufficient power for controlled descent and landing protocols, including, without limitation, hovering descent or runway landing.

Still referring to FIG. 1, at least an energy source 108 may include a cell such as a battery cell, or a plurality of battery cells making a battery module. At least an energy source 108 may be a plurality of energy sources. The module may include batteries connected in parallel or in series or a plurality of modules connected either in series or in parallel designed to deliver both the power and energy requirements of the application. Connecting batteries in series may increase the voltage of at least an energy source 108 which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source 108 may be based on the individual battery cell performance or an extrapolation based on the measurement of at least an electrical parameter. In an embodiment where at least an energy source 108 includes a plurality of battery cells, the overall power output capacity may be dependent on the electrical parameters of each individual cell. If one cell experiences high self-discharge during demand, power drawn from at least an energy source 108 may be decreased to avoid damage to the weakest cell. At least an energy source 108 may further include, without limitation, wiring, conduit, housing, cooling system and battery management system. Persons skilled in the art will be aware, after reviewing the entirety of this disclosure, of many different components of an energy source.

Still viewing FIG. 1, system 100 may include multiple propulsion sub-systems, each of which may have a separate energy source powering a separate plurality of propulsors 104a-n. For instance, and without limitation, each propulsor of plurality of propulsors 104a-n may have a dedicated energy source of at least an energy source 108. Alternatively or additionally, a plurality of energy sources may each provide power to two or more propulsors, such as, without limitation, a "fore" energy source providing power to propulsors located toward the front of an aircraft, while an "aft" energy source provides power to propulsors located toward the rear of the aircraft. As a further non-limiting example, a single propulsor or group of propulsors may be powered by a plurality of energy sources. For example, and without limitation, two or more energy sources may power one or more propulsors; two energy sources may include, without limitation, at least a first energy source having high specific energy density and at least a second energy source having high specific power density, which may be selectively deployed as required for higher-power and lower-power needs. Alternatively or additionally, a plurality of energy sources may be placed in parallel to provide power to the same single propulsor or plurality of propulsors. Alternatively or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential as described below. Persons skilled in the art, upon reviewing the entirety of this disclosure, will be aware of various combinations of energy sources 104 that may each provide power to single or multiple propulsors in various configurations.

With continued reference to FIG. 1, system 100 includes a vehicle controller 112. Vehicle controller 112 may include any computing device or combination of computing devices as described below in reference to FIG. 8. Vehicle controller 112 may include at least a flight controller as described below in reference to FIGS. 7-8. Vehicle controller 112 may include any processor or combination of processors as described below in reference to FIG. 8. Vehicle controller 112 may include a microcontroller. In an embodiment, where system 100 includes an electronic aircraft, vehicle controller 112 is programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Vehicle controller 112 may be configured to operate aircraft by transmitting commands to flight components. As used herein, a "command" is at least an element of data that necessitates a response from at least a component, such as without limitation a flight component; a response may include a change in performance, a communication, a status check, or any other operation that is performed by a component after receiving the command. In some cases, component may include a propulsor and vehicle controller 112 may be configured to send a command to the propulsor. A command may be communicated by way of a signal. Non-limiting signals include electrical signals, optical signals, analog signals, digital signals, serial signal, parallel signals, and the like. Vehicle controller 112 may be designed and configured to operate electronic aircraft via fly-by-wire. Vehicle controller 112 is communicatively coupled to each propulsor of the plurality of propulsors 104a-n; as used herein, vehicle controller 112 is communicatively coupled to each propulsor where vehicle controller 112 is able to transmit signals to each propulsor and each propulsor is configured to modify an aspect of propulsor behavior in response to the signals. As a non-limiting example, vehicle controller 112 may transmit signals to a propulsor via an electrical circuit connecting vehicle controller 112 to the propulsor; the circuit may include a direct conductive path from vehicle controller 112 to propulsor or may include an isolated coupling such as an optical or inductive coupling. Alternatively or additionally, vehicle controller 112 may communicate with a propulsor of plurality of propulsors 104a-n using wireless communication, such as without limitation communication performed using electromagnetic radiation including optical and/or radio communication, or communication via magnetic or capacitive coupling. Vehicle controller may be fully incorporated in an electric aircraft containing plurality of propulsors 104a-n, may be a remote device operating the electric aircraft remotely via wireless or radio signals, or may be a combination thereof, such as a computing device in the aircraft configured to perform some steps or actions described herein while a remote device is configured to perform other steps. According to some embodiments, vehicle controller 112 may determine a command for each propulsor of plurality of propulsors 104a-n. In some cases, vehicle controller 112 may determine command, as a function of one or more flight controller functions, for example without limitation an autonomous function. An exemplary flight controller 112 having an autonomous function is describe in detail with reference to FIGS. 7-8. In some cases, vehicle controller 112 may determine at least a command in order to operate aircraft according to a desired flight plan and/or flight maneuver. In some cases, both desired flight plan and/or flight maneuver and at least a command may be determined using vehicle controller, for example as a function of an autonomous function and/or autonomous mode of the vehicle controller 112. Alternatively or additionally, in some cases, commands may be received by vehicle controller 112, for example without limitation from a remote device. In some cases, a remote device may be terrestrial and/or outside of aircraft. In some cases, vehicle controller 112 may receive one or more of a desired flight plan or maneuver from a remote device. Remote device may be communicatively connected with vehicle controller 112 according to any known networking and/or communications method, including without limitation radio, wireless (Wi-Fi), optical (LiFi), and the like. Persons skilled in the art will be aware, after reviewing the entirety of this disclosure, of many different forms and protocols of communication that may be used to communicatively couple vehicle controller 112 to plurality of propulsors 104a-n.

Still referring to FIG. 1, vehicle controller 112 may be communicatively connected to at least an energy source 108. For instance, and without limitation, vehicle controller 112 may include and/or be connected to at least a sensor 116. At least a sensor may be configured to determine at least an electrical parameter of at least an energy source 108. At least a sensor 116 may be incorporated into vehicle or aircraft or be remote. At least a sensor 116 may be communicatively connected to the vehicle controller 112. Electrical parameters may include, without limitation, voltage, current, impedance, resistance, temperature. Current may be measured by using a sense resistor in series with the circuit and measuring the voltage drop across the resister, or any other suitable instrumentation and/or methods for detection and/or measurement of current. Voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. Alternatively, or additionally, vehicle controller 112 may be wired to at least an energy source 108 via, for instance, a wired electrical connection. Vehicle controller 112 may measure voltage, current, or other electrical connection. This may be accomplished, for instance, using an analog-to-digital converter, one or more comparators, or any other components usable to measure electrical parameters using an electrical connection that may occur to any person skilled in the art upon reviewing the entirety of this disclosure.

Still referring to FIG. 1, at least a sensor 116 may be configured to measure at least an electrical parameter of at least an energy source 108 and may be communicatively connected, as defined above, to vehicle controller 112. Sensor 116 may be used to measure a plurality of electrical parameters. In an embodiment, the first electrical parameter may include, without limitation, voltage, current, resistance, or any other parameter of an electrical system or circuit. The second electrical parameter may be a function of the first electrical parameter. A third electrical parameter may be calculated from the first and second electrical parameters as a delta or function. For example, the current may be calculated from the voltage measurement. Resistance may be calculated from using the voltage and current measurements. Vehicle controller 112 may be connected to a plurality of sensors; for instance, a plurality of sensors may measure a plurality of electrical parameters and/or measure one or more parameters at a plurality of energy sources of at least an energy source 108. In some cases, at least a sensor 116 may be configured to detect, measure, calculate or otherwise determine one or more of resistance, potential, current, impedance, inductance, capacitance, and the like.

Continuing to refer to FIG. 1, at least a sensor 116 may include one or more sensors configured to detect additional phenomena. For instance, at least a sensor 116 may include one or more motion sensors, which may include any element suitable for use as an inertial measurement unit (IMU) or any component thereof, including without limitation one or more accelerometers, one or more gyroscopes, one or more magnetometers, or the like. Motion sensors may be selected to detect motion in three directions spanning three dimensions; for instance, a set of three accelerometers may be configured or arranged to detect acceleration in three directions spanning three dimensions, such as three orthogonal directions, or three gyroscopes may be configured to detect changes in pitch spanning three dimensions, such as may be achieved by three mutually orthogonal gyroscopes. At least a sensor may include one or more environmental sensors, including without limitation sensors for detecting wind speed, temperature, or the like.

With continued reference to FIG. 1, where system 100 is incorporated into an electric aircraft, vehicle controller 112 may be programmed to operate the electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. At least a flight maneuver may include a runway landing, defined herein as a landing in which a fixed-wing aircraft, or other aircraft that generates lift by moving a foil forward through air, flies forward toward a flat area of ground or water, alighting on the flat area and then moving forward until momentum is exhausted on wheels or (in the case of landing on water) pontoons; momentum may be exhausted more rapidly by reverse thrust using propulsors, mechanical braking, electric braking, or the like. At least a flight maneuver may include a vertical landing protocol, which may include a rotor-based landing such as one performed by rotorcraft such as helicopters or the like. In an embodiment, vertical landing protocols may require greater expenditure of energy than runway-based landings; the former may, for instance, require substantial expenditure of energy to maintain a hover or near-hover while descending, while the latter may require a net decrease in energy to approach or achieve aerodynamic stall. Vehicle controller 112 may be designed and configured to operate electronic aircraft via fly-by-wire. Vehicle controller 112 may direct propulsors of plurality of propulsors 104a-n, to perform one or more flight maneuvers as described above, including takeoff, landing, and the like. Vehicle controller 112 may be configured to perform a partially or fully automated flight plan. Further disclosure related to autonoumous function of vehicle controller 112 is described below in reference to FIGS. 7-8. In an embodiment, controller 112 may be configured to command plurality of propulsors 104a-n, such as one or more motors or propellers, to increase power consumption, for instance to transition to rotor-based flight at aerodynamic stall during a vertical landing procedure or to a runway based controlled descent. Vehicle controller 112 may determine a moment to send a command to an instrument to measure time, such as a clock, by receiving a signal from one or more sensors, or a combination thereof; for instance, vehicle controller 112 may determine by reference to a clock and/or navigational systems and sensors that electric aircraft is approaching a destination point, reduce airspeed to approach aerodynamic stall, and may generate a timing-based prediction for the moment of aerodynamic stall to compare to a timer, while also sensing a velocity or other factor consistent with aerodynamic stall before issuing the command. Persons skilled in the art will be aware, upon reviewing the entirety of this disclosure, of various combinations of sensor inputs and programming inputs that vehicle controller 112 may use to guide, modify, or initiate flight maneuvers including landing, steering, adjustment of route, and the like.

With continued reference to FIG. 1, in an embodiment, vehicle controller 112 is designed and configured to perform methods of maintaining attitude control of an electronic multi-propulsion system under degraded or depleted energy source conditions, as described in further detail below. Vehicle controller may be configured to perform any embodiment of any method and/or method steps as described in this disclosure with any degree of repetition or reiteration, and/or in any order. As a non-limiting example, vehicle controller 112 may be designed and configured to calculate initial power levels for the plurality of propulsors, the initial power levels including an initial power level for each propulsor of the plurality of propulsors, detect a present power output capability of the at least an energy source, calculate at least a power demand of the plurality of propulsors as a function of the initial power levels, determine that the present power output capability is insufficient to match the at least a power demand, and, for each initial power level of the plurality of initial power levels, generate a reduced power level, the reduced power level less than the initial power level and direct a corresponding propulsor of the plurality of propulsors to consume electrical power at the reduced power level. As another non-limiting example, vehicle controller 112 may be designed and configured to propulsors, the vehicle controller designed and configured to determine commands for the plurality of propulsors, the commands include a command for each propulsor of the plurality of propulsors, calculate initial power levels for the plurality of propulsors as a function of the commands, the initial power levels including an initial power level for each propulsor of the plurality of propulsors, detect a present power output capability of the at least an energy source, determine that the present power output capability is insufficient to match the initial power levels, and for each initial power level of the plurality of initial power level generate a reduced power level, the reduced power level less than the initial power level and direct a corresponding propulsor of the plurality of propulsors to consume electrical power at the reduced power level.

Still referring to FIG. 1, in some embodiments, vehicle controller 112 may be additionally designed and configured to determine commands for plurality of propulsors 104a-n as a function of an autonomous function. In some embodiments, vehicle controller 112 may be additionally designed and configured to determine commands for plurality of propulsors 104a-n at least in part by receiving the commands from a remote device.

Figure 3:
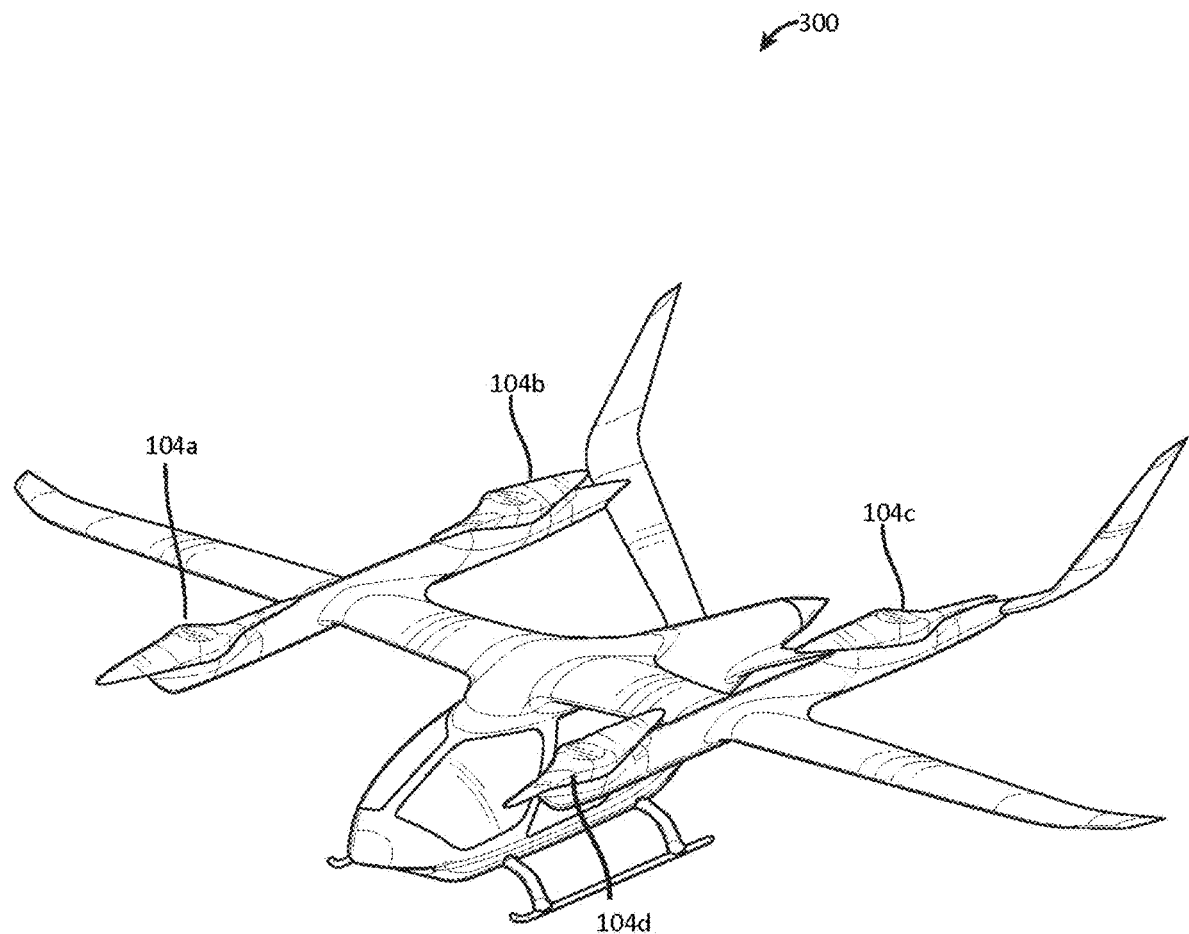
FIG. 3 is a schematic diagram depicting an exemplary embodiment of an electric aircraft.

Referring to FIG. 3, system 100 may be incorporated in an electric aircraft 300. An electric aircraft may be an aircraft powered by at least an energy source 108. Electric aircraft 300 may include one or more wings or foils for fixed-wing or airplane-style flight and/or one or more rotors for rotor-based flight. Electric aircraft 300 may include a plurality of propulsors 104a-n, which may include any propulsors as described above. In an embodiment, electric aircraft 300 may combine elements of rotorcraft with wings or foils and be capable of performing both rotor-based and fixed-wing flight maneuvers; flight plan may call, for example, for vertical takeoff and landing with rotors and fixed-wing cruising flight, while electric aircraft 300 may be capable of rotor-based cruising flight, airplane-style takeoff, and/or airplane style landing as well. Electric aircraft 300 may be a vertical takeoff and landing (VTOL) aircraft. Electric aircraft 300 may be an electric VTOL (eVTOL) aircraft. In an embodiment, electric aircraft 300 may be a rotor-based craft such as a "quad copter," multi-rotor helicopter, or other vehicle that maintains its lift primarily using downward thrusting propulsors such as rotors. Electronic aircraft 300 may control its attitude completely or substantially completely using propulsors; alternatively or additionally, electronic aircraft 300 may include elements usable in wing-born flight, such as foils, elevators, rudders, and ailerons, which control attitude in one or more phases of flight independently of propulsors. Electronic aircraft 300 may combine such wing-based elements with lift-generating propulsors; for instance, electronic aircraft 300 may have propulsors that are directed or may be directed downward to generate lift for vertical takeoff, vertical landing, and/or hover maneuvers, which may necessitate propulsor-based attitude control for at least those phases of flight.

Figure 4A:
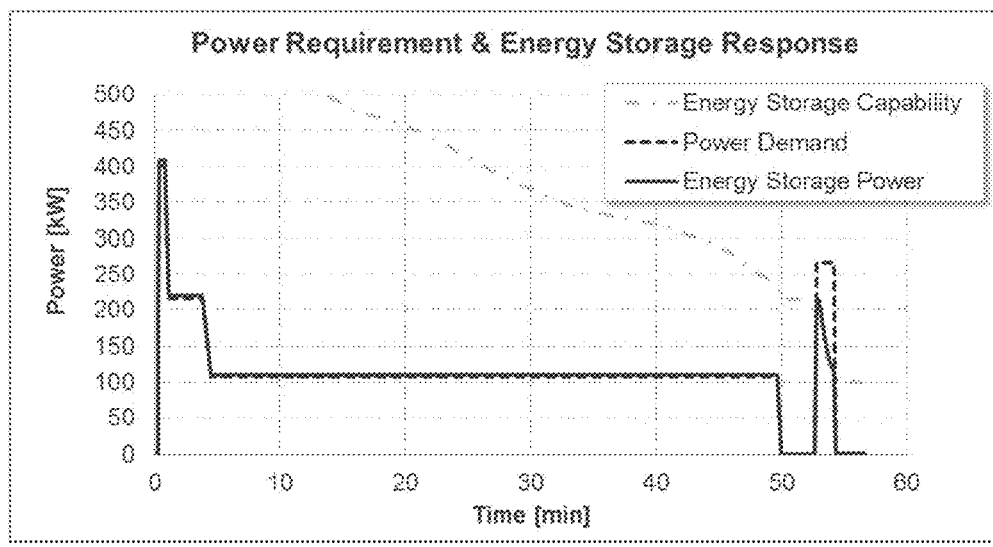
FIGS. 4A-C are graphs illustrating exemplary plots of electric aircraft power demand, energy source power capability, energy source potential, and charge state versus time in an embodiment.
Figure 4B:
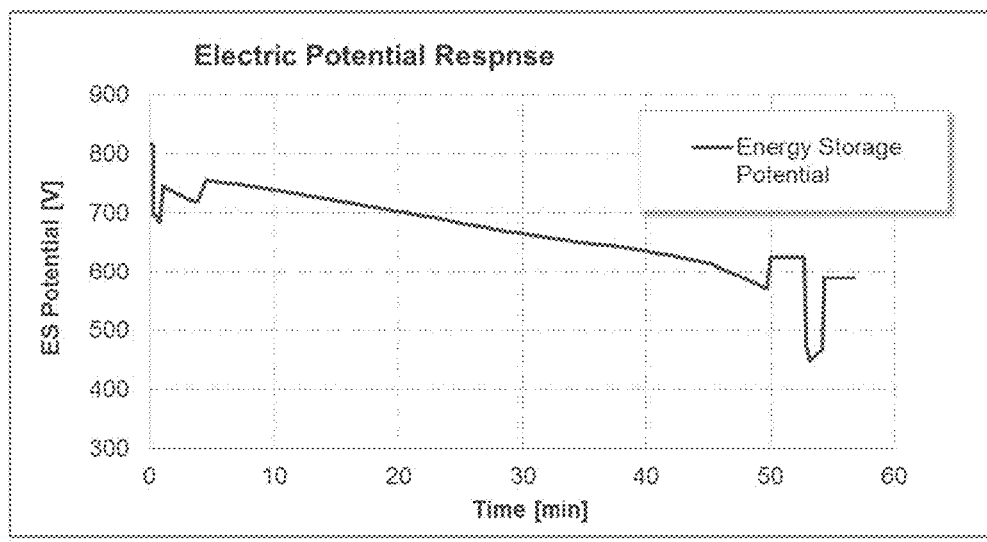
Figure 4C:
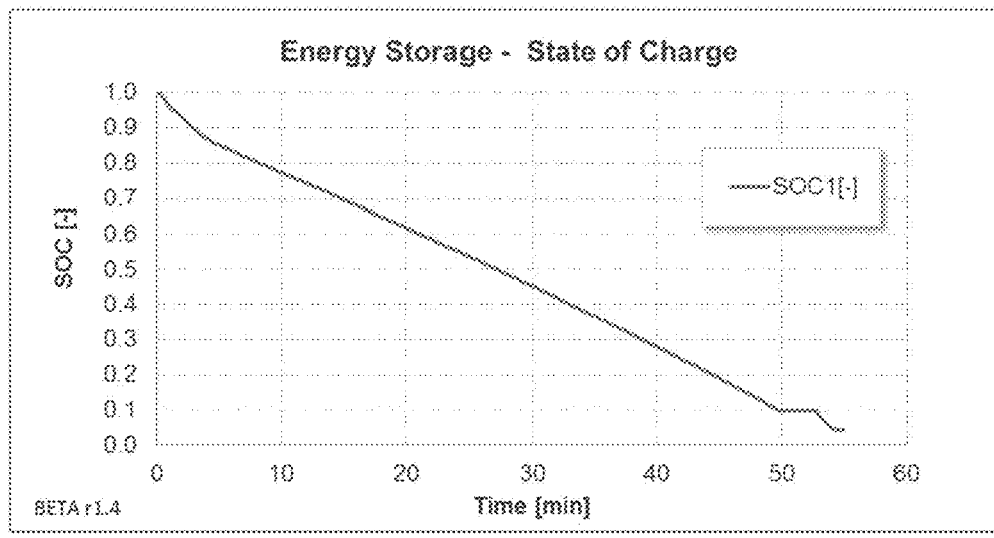

Referring now to FIGS. 4A-C, include graphs illustrating how decline of energy source state of charge and power delivery capability can combine to "clip" propeller power output for propellers requiring higher power output as required for attitude control in exemplary embodiments. In other words, FIGS. 4A-C illustrate examples of plots of electric aircraft power demand, energy source power capability, energy source potential, and charge state versus time. As illustrated for instance as an exemplary embodiment in FIG. 4A, propulsion power demands may vary over time as dictated by stages in a flight or flight plan, or by unexpected changes in conditions; such demands may represent either demand of any individual propulsor, as illustrated for instance in the graph on the left or may represent the sum of all propulsors' power demands. FIG. 4A has vertical axis that denotes power in kilowatts and a horizontal axis that denotes time in minutes. As shown in FIG. 4A, energy source and/or storage capability represented as a dotted line with alternating long and short dot lengths) may decline over the course of a flight; thus, where power demands (represented as a dotted line in the graph) exceed energy source capacity, the power produced by energy source/storage (represented by a solid line) is "clipped" to a value less than that of the power demand, which may be represented as following the declining curve in the energy storage/source capabilities. Consequently, one or more propulsors may fail to output the expected power corresponding to a command from vehicle controller, resulting in a loss of attitude control. FIG. 4B illustrates changes in energy source electric potential over time in an exemplary embodiment; energy source electric potential may decline over the course of a flight in an embodiment, for instance where energy source is an energy storage device such as a battery as described above. FIG. 4B has a vertical axis that denotes potential in volts and a horizontal axis that denotes time in minutes. FIG. 4C illustrates an exemplary embodiment of a change in state of charge of an energy source over time; in an embodiment, state of charge may gradually decrease over time, for instance where energy source includes an energy storage device. FIG. 4C has a vertical axis that denotes a unitless measure indicating a state of charge and a vertical axis that denotes time in minutes.

Figure 5:
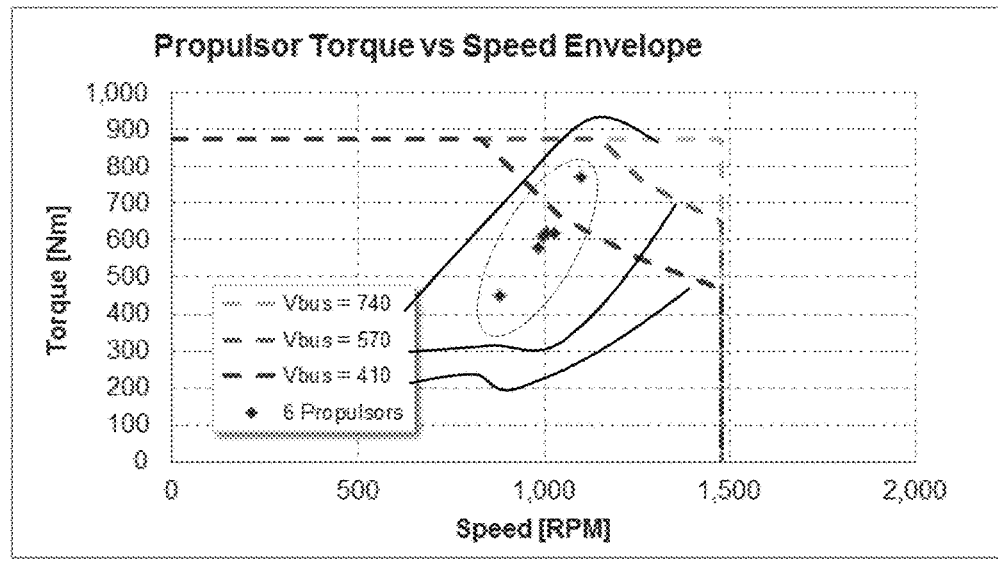
FIG. 5 is a graph illustrating a depleted energy source scenario where power demands to a single propulsor are not supportable.

Turning now to FIG. 5, and for illustrative purposes only, a graph illustrates an exemplary scenario, which for the purposes of discussion is denoted herein as "Case A," in which a single propulsor presents power demands exceeding current capabilities of at least an energy source 108. FIG. 5 has a vertical axis that denotes torque in newton-meters and a horizontal axis that denotes speed in revolutions per minute (RPM). Illustrated for exemplary purposes only are six propulsor operating points for given attitude control conditions; torque-speed capability envelopes of the six propulsors are overlaid. As illustrated, where energy source/storage potential drops below a certain level, one propulsor requiring a greater degree of combined torque and speed may require more potential than an energy source powering that propulsor and/or a plurality of propulsors including that propulsor is capable of producing at a current capability/state of charge. This may result in that propulsor being unable to maintain its contribution to vehicle attitude, causing attitude control to degrade. As a non-limiting example, and for illustrative purposes only, when an electric potential of an energy source of plurality of energy sources 108 falls below a demanded electric potential of an energy source, 500 volts in this non-limiting illustration, an operating point for a propulsor may fall down along the propulsor's torque-speed load curve to fall to a lower level (not shown) within the applicable torque-speed envelope, resulting in less thrust than required and/or optimal for attitude control. As a result, where different propulsors have different power output demands, propulsors may be limited by the maximal potential available from at least an energy source 108, limiting the actual power output to a greater degree relative to expected power output, so that propulsors commanded to output higher power, which may be the most crucial to maintaining attitude control, are limited to a greater degree. This can cause an electric aircraft to lose attitude control, with potentially catastrophic results. Systems and methods may avoid this outcome by ensuring that reductions in propulsor power output are evenly distributed, so that attitude control as dictated by relative power output of propulsors is maintained, as set forth in further detail below.

Figure 6A:
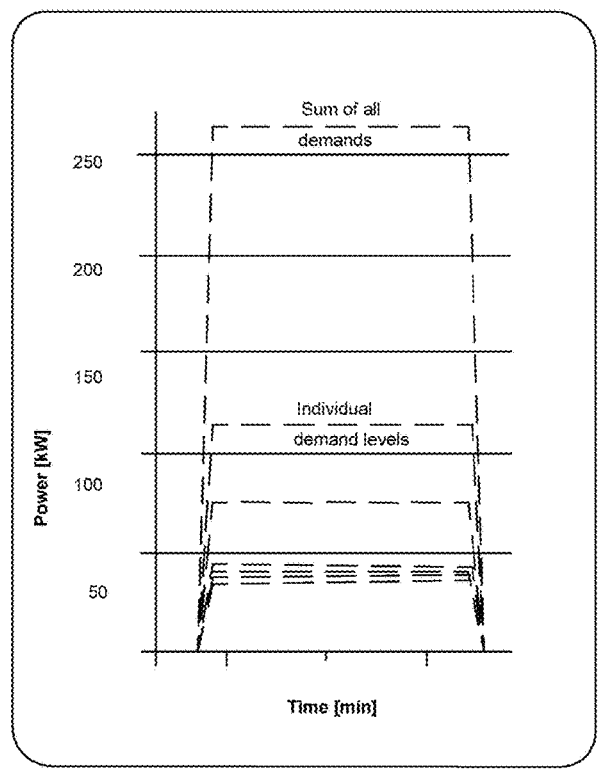
FIGS. 6A-C are graphs illustrating a depleted energy source scenario where power demands to a plurality of propulsors are not supportable, and contrasting disproportionate power reductions to proportionate power reductions.
Figure 6B:
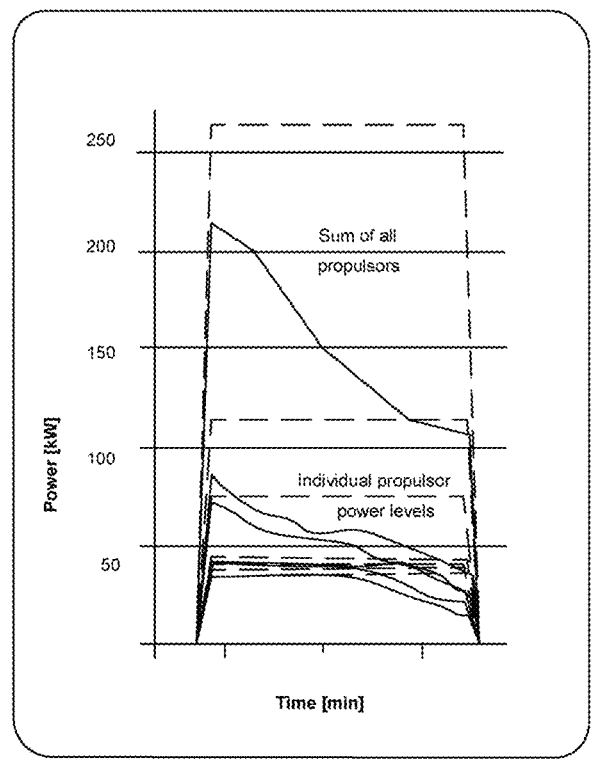
Figure 6C:
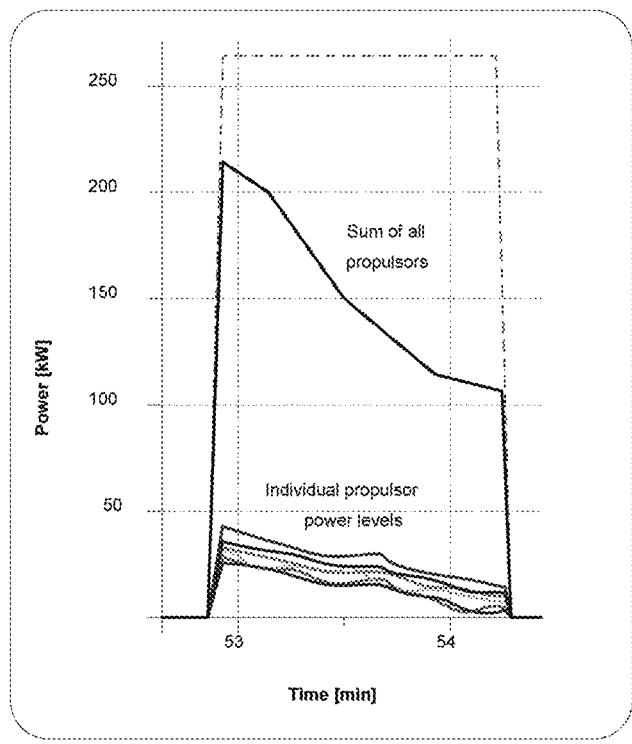

Referring now to FIG. 6A, and for exemplary purposes only, a graph illustrates a scenario, which for purposes of discussion is denoted "Case B", wherein at least an energy source 108 and/or one or more energy sources of at least an energy source 108 has insufficient power delivery capability to meet power demands to a plurality of propulsors. FIG. 6A has a vertical axis that denotes power in kilowatts and a horizontal axis that denotes time in minutes. Individual power demands corresponding to individual demands of each propulsor, and a sum of the individual power demands, are shown in dotted lines. Available power (not shown) or an equivalent metric as disclosed herein may be determined to be insufficient to meet the sum of all demands, such that an actual response by propulsors includes a lower total output. In an embodiment, in this scenario, at least an energy source 108 and/or one or more energy sources of at least an energy source 108 may have its terminal potential meet or surpass the lowest allowable potential for safe operation power demand is not modified, so all propulsors will be impacted. This may result in all propulsors consuming less power than intended or determined as necessary for a vehicle control action as described in further detail below. FIG. 6B has a vertical axis that denotes power in kilowatts and a horizontal axis that denotes time in minutes. FIG. 6B illustrates individual propulsor outputs and an output corresponding to a sum of all propulsors, shown in solid lines, as might occur without application of systems and methods as disclosed herein: certain propulsors may consume power at substantially higher levels than certain other propulsors, resulting in a distribution of thrust that does not match the proportional distribution of thrust as required to maintain a commanded attitude. Moreover, distribution of power consumption may vary over time, causing unpredictable changes in attitude which may destabilize an aircraft, and which may result in calculations for stability maintenance beyond the capacity of controller 112 and/or algorithms implemented thereon. Where system 100 has calculated and applied a reduction factor as described in further detail in this disclosure, and as illustrated in FIG. 6C, the reduced power consumption of individual propulsors may be proportional to the demanded power consumption, resulting in a thrust distribution that maintains attitude in the commanded position, although the aggregate thrust is no greater, and evolves more consistently over time. Like FIGS. 6A-B, FIG. 6C has a vertical axis that denotes power in kilowatts and a horizontal axis that denotes time in minutes. This may result in superior attitude control, as described in further detail in this disclosure. Systems and methods as described herein may thus enable reductions in power to plurality of propulsors to be performed in proportions maintaining propulsors' relative torque-speed output to one another, maintaining attitude control, as described in further detail below. For instance, and as described in further detail below, flight controller may act to maintain a pilot or flight controller-assigned position as against the horizontal, such that, as a non-limiting example, an aircraft in the act of landing may fall vertically rather than flipping over or otherwise arriving in a damaging or otherwise undesirable orientation with respect to the ground.

Figure 7:
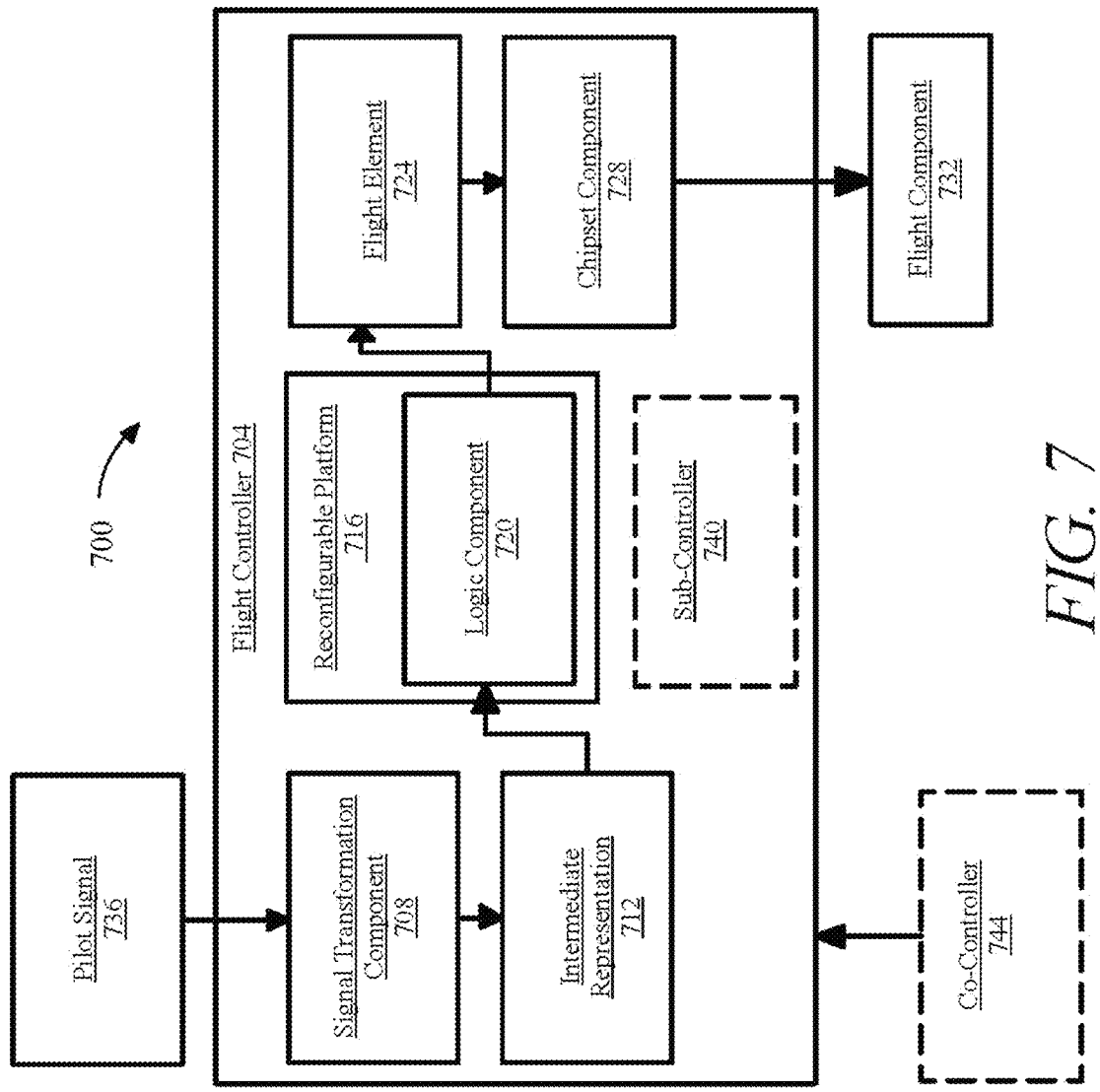
FIG. 7 is a block diagram of an exemplary flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an autocode, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
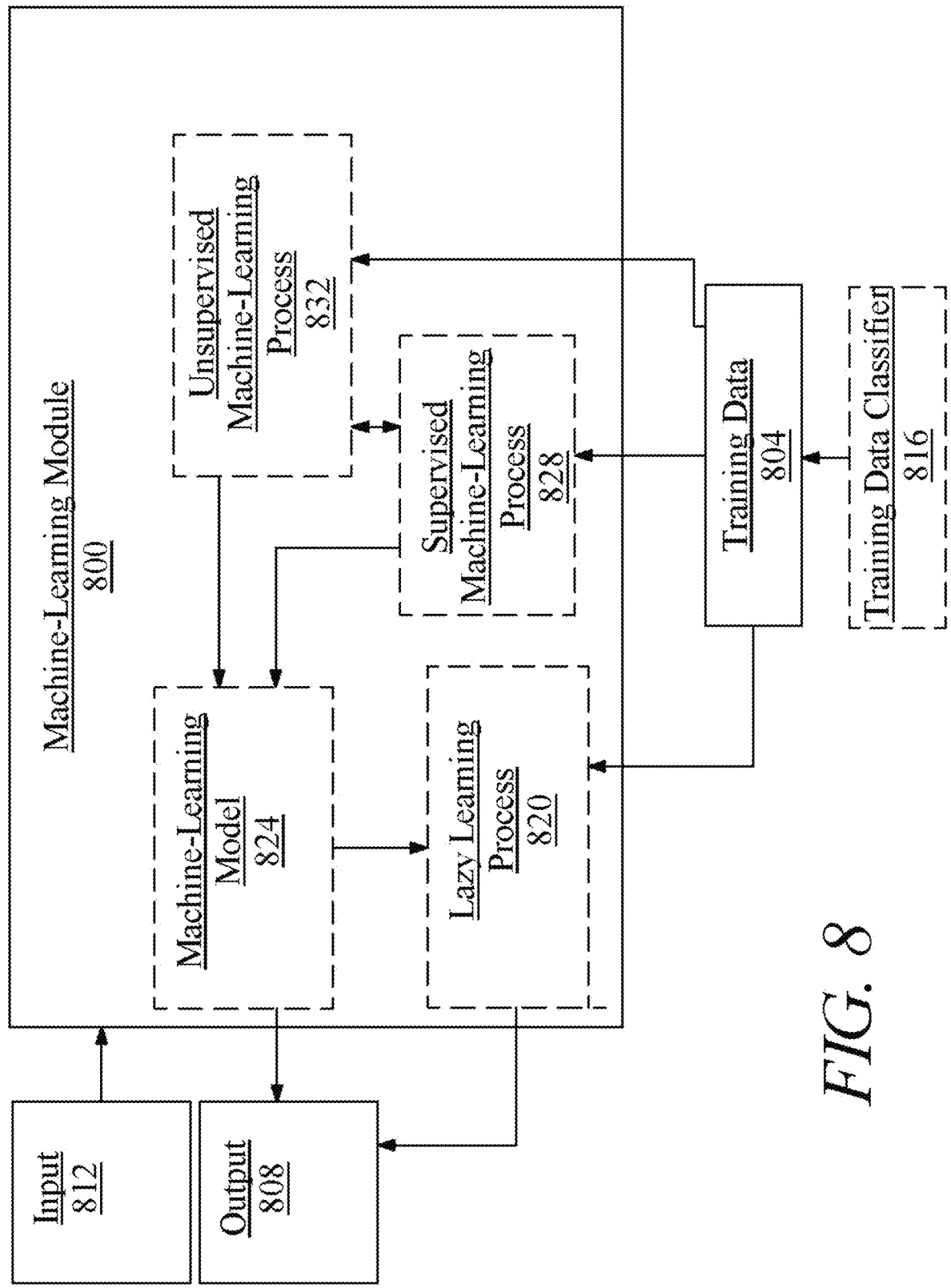
FIG. 8 is a block diagram of an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example flight elements and/or pilot signals may be inputs, wherein an output may be an autonomous function.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Referring now to FIG. 7, an exemplary embodiment of a method 900 of maintaining attitude control of an electronic multi-propulsion system under degraded or depleted energy source conditions is illustrated. At step 905, a vehicle controller 112 communicatively coupled to a plurality of propulsors 104a-n powered by at least an energy source 108, determines commands for the plurality of propulsors 104a-n. Commands for plurality of propulsors may include a command for each propulsor of the plurality of propulsors. Commands may include any commands described in this disclosure, for instance with reference to FIGS. 1-8. In some embodiments, step 905 may additionally include determining commands as a function of an autonomous function. Autonomous function may include any autonomous function and/or autonomous mode described in this disclosure, for instance with reference to FIGS. 1-8. In some embodiments, step 905 may additionally include receiving commands from a remote device. Remote device may include any remote device described in this disclosure, for instance in reference to FIGS. 1-8. Vehicle controller may receive commands from a remote device using any network and/or communications methods described in this disclosure, including for example those described with reference to FIGS. 1-8 and FIG. 10.

Figure 9:
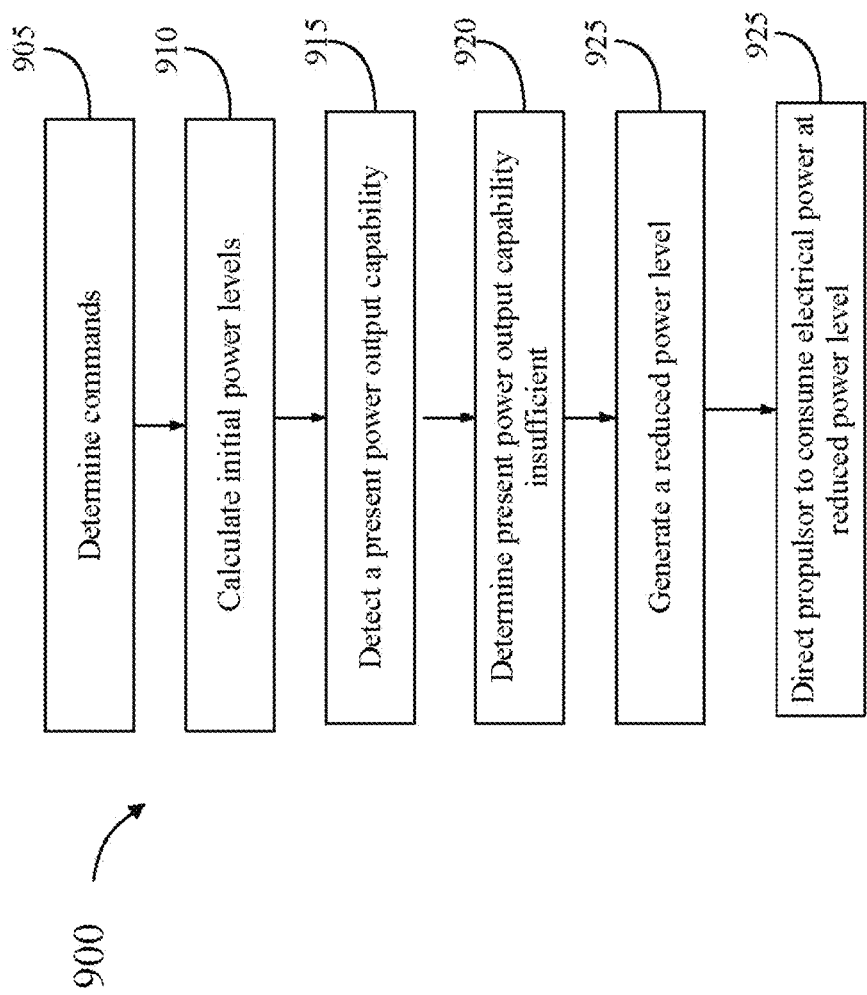
FIG. 9 is a flow diagram depicting an exemplary embodiment of a method of maintaining attitude control under degraded energy source conditions using multiple propulsors.
Figure 10:
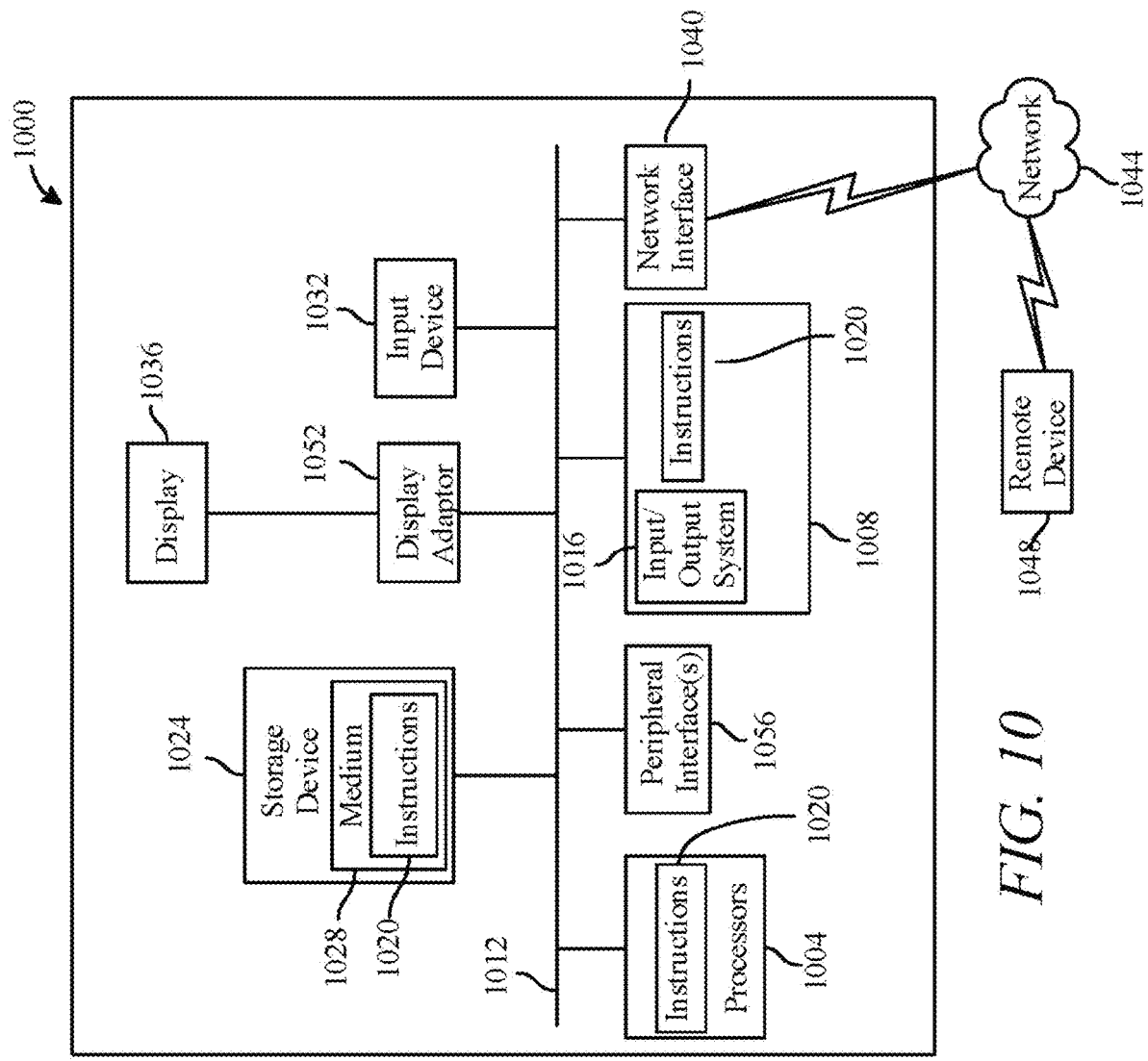
FIG. 10 is a block diagram of a computing system that can be used to implement any one or more of the methodologies disclosed herein and any one or more portions thereof.

With continued reference to FIG. 9, at step 910, a vehicle controller 112 calculates initial power levels for the plurality of propulsors 104a-n; initial power levels include an initial power level for each propulsor of the plurality of propulsors 104a-n. Initial power levels may be calculated as a function of commands. For example, in some cases, commands may be transmitted to propulsors causing propulsors may be responding to commands and initial power levels may be measured, estimated, detected, or otherwise determined. Alternatively or additionally, in some cases, initial power levels may be simulated, estimated, modeled, or otherwise determined without transmitting commands to propulsors. In some cases, commands are intended to operate aircraft according to a desired flight plan and/or maneuver. Initial power levels may be expressed in terms of any circuit parameter and/or propulsor parameter corresponding to a degree of power consumption of propulsors of plurality of propulsors 104a-n. As a non-limiting example, propulsors may be commanded in terms of propulsor torque. Initial power levels may include, without limitation, one or more desired or intended power levels. Vehicle controller 112 may calculate each initial power level based on one or more navigational or propulsion goals. One or more navigational or propulsion goals may include, without limitation, one or more goals concerning attitude control; for instance, a goal may include keeping a craft in a particular attitude with regard to the desired attitude dictated by the flight controller or pilot for the given conditions; particular attitude may include a particular pitch or yaw orientation compared to the horizontal or to another reference point or collection thereof, such as reference points built into instrumentation measuring aircraft orientation in three dimensions. As a non-limiting example, in a side wind, an aircraft may not be level, but it may maintain a relatively stationary position and/or orientation over a target landing zone. A goal regarding attitude may require, for instance, that attitude be maintained within a given tolerance of a particular pitch angle with regard to a horizontal axis, a particular roll angle with regard to a particular horizontal axis, or a combination thereof. A goal regarding attitude may include a goal or requirement with regard to an aircraft position relative to a flight path; as a non-limiting example a requirement may specify that the aircraft have a yaw angle from the flight path of no more than a threshold amount or tolerance. Navigational and/or propulsion goals may include an acceleration or speed; for instance, a navigational and/or propulsion goal may include a goal to maintain a certain airspeed velocity, such as a velocity required to maintain wing-based lift under current conditions, or an acceleration required to attain a certain airspeed velocity. In some embodiments, navigational and/or propulsion goals may be determined as a function of an autonomous function or autonomous mode of a flight controller. In some embodiments, navigational and/or propulsion goals may be received from a remote device. Navigational and/or propulsion goals may include one or more goals regarding a required altitude, such as a maximal or minimal altitude required by local airspace regulations; goal regarding altitude may include maintaining altitude within a tolerance or threshold amount of the required altitude, and/or a movement up or down to arrive at or within a tolerance or threshold amount of the required altitude. Navigational and/or propulsion goals may include one or more requirements regarding flight path; for instance, an aircraft incorporating system 100 may be required to change direction to go around restricted airspace, to correct its heading because of an error in navigation or a sudden gust, or the like.

Still referring to FIG. 9, vehicle controller 112 may determine commands to transmit to one or more propulsors to meet one or more navigational and/or propulsion goals; vehicle controller 112 may determine each initial power level as a function of commands. In an embodiment, initial power level may be determined by calculating power requirements as a result of each command using a model of a thrust element 212 to determine a degree of resistance to thrust element 212 under current conditions. Initial power level may be determined by calculating power requirements as a result of each command using a model of motor 200. Calculations to determine initial power requirements may include an estimation of back EMF to be generated by propulsor and/or motor 200 under current conditions and given a command to propulsor; this determination may be performed using a model of thrust element 212, a model of motor 200, and/or a combination thereof. Vehicle controller 112 may perform such calculations using lookup tables or mathematical relations as described above; for instance, vehicle controller 112 may retrieve from a lookup table a potential level necessary to drive a propulsor at a given velocity, with a given back EMF such as a back EMF derived using models of at least a thrust element 212 and/or motor 200 as described above, or using a mathematical relation such as an equation relating potential demand of a propulsor as a function of desired propulsor velocity and/or back EMF. Persons skilled in the art, upon reviewing the entirety of this disclosure, will be aware of various alternative means for determining a potential and/or power demand of a propulsor as described herein. Power levels of plurality of propulsors 104a-n may be calculated with regard to parameters other than electric potential alternatively or in addition to the above-described determination, including without limitation current or power demands. In an embodiment, sensor feedback using any sensor as described above may replace or supplement calculation of potential and/or power consumption requirements. For instance, vehicle controller 112 may record sensor feedback indicating angular velocity of and/or torque exerted by motor 200 in one or more instances, along with corresponding electrical parameters of the circuit driving motor 200 such as voltage, current, power consumed, or the like, and storing values so derived; vehicle controller 112 may look up such stored values to determine potential and/or power consumption at a given desired angular speed or torque for a propulsor. Vehicle controller 112 may perform interpolation or regression to predict likely potential and/or power consumption at an angular speed and/or torque not specifically recorded. Vehicle controller 112 may alternatively or additionally determine power levels by reference to one or more stored values associating power levels and/or power consumption needs of one or more propulsors for performing one or more maneuvers; for instance, a maneuver requiring a change in pitch and/or yaw may involve a known increase or decrease in power to one or more propulsors as required to modify pitch and/or yaw. A hovering, takeoff, or landing maneuver may be associated with a known power level for a propulsor. Stored values may be combined with sensor feedback and/or estimates of back EMF, torque, and the like to determine an accurate or updated power level depending on conditions. For instance, where wind is tending to turn an electric aircraft 300 incorporating system 100 and/or push the electric aircraft into an undesirable attitude, one or more propulsors may have to exert greater torque or turn at a greater angular velocity to counteract the forces imposed by the wind; vehicle controller 112 may modify power level accordingly by detecting changes in attitude, external conditions, and/or higher back EMF from one or more propulsors. Initial power level may be calculated using torque feedback from one or more propulsors, for instance as described in further detail below. Persons skilled in the art, upon reviewing the entirety of this disclosure, will be aware of various approaches that may be used to determine or estimate power consumption requirements of a propulsor as a function of a vehicle controller 112 command to be transmitted to the propulsor.

At step 915, and still referring to FIG. 9, vehicle controller 112 determines a present power output capability of the at least an energy source. As used herein, a power output capability is a capability to deliver power and/or energy to a load or component powered by at least an electrical energy source 108. A power output capability may include a power delivery capability, which may include peak power output capability, average power output capability, a duration of time during which a given power level, including without limitation peak and/or average power output capability, may be maintained, and/or a time at which a given power level may be delivered, where the time is provided in terms of a measure of time in seconds or other units from a given moment, a measure of time in seconds or other units from a given point in a flight plan, or as a given point in a flight plan; that is, a time when power may be provided may be rendered as a time at which an aircraft arrives at a particular stage in a flight plan, such that, as a non-limiting example, power output capability may indicate whether peak power may be provided at or during a landing stage of flight. Power output capability may include energy delivery capability, including without limitation a total amount of remaining energy deliverable by a given electrical energy source, as well as one or more factors such as time, temperature, or rate that may affect the total amount of energy available; for instance, circumstances that increase output impedance and/or resistance of at least an electrical energy source, and thus help determine in practical terms how much energy may actually be delivered to components, may be a part of energy delivery capability. At least a power output capability may be determined by any suitable method, including without limitation using one or more models of the at least an energy source to predict one or more circuit parameters of electric power output; one or more circuit parameters of electric power output may include power, current, voltage, or any other measure of a parameter of an electric circuit. One or more models may include, without limitation, a lookup table providing the one or more circuit parameters based on conditions of at least an energy source and/or of a circuit containing the at least an energy source; conditions may include, without limitation, a state of charge of the at least an energy source, a temperature of the at least an energy source, a resistance of a load connected to the at least an energy source, a current, voltage, or power demand of a circuit or load connected to the at least an energy source, or the like. One or more models may include one or more equations, graphs, or maps relating the one or more circuit parameters to one or more conditions as described above. One or more models may be created using data from a data sheet or other data provided by a manufacturer, data received from one or more sensors during operation of system 100, simulation generated using a simulation program that models circuit behaviors, analysis of analogous circuits, any combination thereof, or any other predictive and/or sensor-based methods for determining relationships between one or more circuit parameters and one or more conditions.

With continued reference to FIG. 9, determination of power output capability may be performed by any suitable method, including without limitation using one or more models of the at least an energy source to predict one or more circuit parameters of electric power output; one or more circuit parameters of electric power output may include power, current, voltage, resistance or any other measure of a parameter of an electric circuit. One or more models may include, without limitation, a lookup or reference table providing the one or more circuit parameters based on conditions of at least an energy source and/or of a circuit containing the at least an energy source; conditions may include, without limitation, a state of charge of the at least an energy source, a temperature of the at least an energy source, a resistance of a load connected to the at least an energy source, a current, voltage, or power demand of a circuit or load connected to the at least an energy source, or the like. One or more models may include one or more equations, reference, graphs, or maps relating the one or more circuit parameters to one or more conditions as described above. One or more models may be created using data from a data sheet or other data provided by a manufacturer, data received from one or more sensors during operation of in-flight operational assessment system 100, simulation generated using a simulation program that models circuit behaviors, analysis of analogous circuits, any combination thereof, or any other predictive and/or sensor-based methods for determining relationships between one or more circuit parameters and one or more conditions. The power capacity of at least an energy source 108 may decline after each flight cycle, producing a new set of data or reference tables to calculate parameters.

Still viewing FIG. 9, and as a non-limiting example, determining present power output capability of at least an energy source may include determining an electric potential of the at least an energy source 108 under load, where potential under load is the potential that would be measured across one or more energy sources of at least an energy source 108 while providing power to plurality of propulsors 104a-n at initial power level. Vehicle controller 112 may determine electric potential as a function of a circuit model of the at least an energy source 108 under load; for instance, vehicle controller 112 may have stored values describing the degree to which the electric potential of each energy source of the at least an energy source 108 declines with increase in current draw and/or decrease in state of charge. As a non-limiting example, a battery with a low state of charge from which a load, such as without limitation plurality of propulsors 104a-n, is drawing a high current may have a measured potential across poles that is 50% of the battery's nominal potential; vehicle controller 112 may have stored in memory one or more lookup tables, for instance in multi-dimensional array form or in the form of any other suitable data structure, describing probable potential across a given battery at a given state of charge and/or load current demand. Such lookup tables or equivalent data structures may be obtained from technical specifications, such as datasheets, describing battery behavior. Alternatively or additionally, vehicle controller 112 may store in memory one or more mathematical relations relating potential to current demand and/or state of charge; for instance, a mathematical equation relating potential to current and/or state of charge may exist which sufficiently models potential decline as a function of current draw and/or state of charge. Vehicle controller 112 may likewise store in memory mathematical relationships between power output commands, back EMF, or other characteristics and current demands in a circuit linking at least an energy source 108 to plurality of propellers. Persons skilled in the art will be aware, upon review of the entirety of this disclosure, of various ways in which potential across an energy source may be predicted based on circuit conditions under load, each of which is considered to be within the scope of this disclosure.

In an embodiment, and with continued reference to FIG. 9, vehicle controller 112 may use state of voltage (SOV) of at least an energy source 108 to determine a current state and power output capability of at least an energy source 108. State of voltage may be determined based on open-circuit voltage; open circuit voltage may, as a non-limiting example, be estimated using voltage across terminals, for instance by subtracting a product of current and resistance, as detected and/or calculated using measured or sampled values, to determine open-circuit voltage. As a non-limiting example, instantaneous current and voltage may be sampled and/or measured to determine Delta V and Delta I, representing instantaneous changes to voltage and current, which may be used in turn to estimate instantaneous resistance; low-pass filtering may be used, as a non-limiting example, to determine instantaneous resistance more closely resembling a steady-state output resistance of at least an energy source 108 than from transient effects, either for discharge or recharge resistance. Open-circuit voltage may, in turn be used to estimate depth of discharge (DOD) and/or SOC, for instance by reference to a data sheet graph or other mapping relating open circuit voltage to DOD and/or SOC. Remaining charge in at least an energy source 104 may alternatively or additionally be estimated by one or more other methods including without limitation current integrator estimate of charge remaining.

Still referring to FIG. 9, SOV and/or open circuit voltage of at least an energy source 104 and/or one or more cells or components thereof may be used to determine power output capability in an embodiment. Discharging a battery to the minimum allowed potential, such as without limit a potential below which propulsor torque production may be adversely affected, may give maximum discharge power. This may be a function of a cell and/or battery's open circuit potential and series resistance, as determined for instance using the following equation:

$$P_{batt.max\ discharge} = (V_{oc} - V_{cell.min}) * V_{cell.min} / Batt.resistance.discharge$$

where Voc is open circuit voltage, Vbatt.min is the minimum allowed open circuit potential of a battery and/or cell, and batt.resistance.discharge is a battery's and/or cell's discharge resistance, which may be calculated in an embodiment as described above. One or more additional calculations may be used to aid in determination of likely future behavior of at least an electrical energy source. For instance, a derivative of open circuit voltage with respect to state of charge (SOC) may be calculated and/or plotted. Alternatively or additionally, a derivative of resistance with respect to SOC may be tracked. In an embodiment, measurements of voltage and/or current may be used to determine the actual resistance within a battery or cell; any of detected voltage under load, determined open circuit voltage, current, and/or internal resistance may be used to project likely future power-delivery capability, voltage, and/or current output capability of battery using one or more models of battery performance, such as plots indicating likely voltage output versus internal resistance and/or current.

With continued reference to FIG. 9, vehicle controller 112 may determine source state of charge. SOC, as used herein, is a measure of remaining capacity as a function of time and is described in more detail below. SOC and/or maximum power at least an energy source 108 can deliver may decrease during flight as the voltage decreases during discharge. SOC and/or power output capacity of an energy source may be associated with an ability of energy source to deliver energy as needed for a task such as driving a propulsor for a phase of flight such as landing, hovering, or the like. Other factors, including state of voltage, and/or estimates of state of voltage or other electrical parameters of an energy source, may be used to estimate a present state of at least an energy source 108 and/or future ability to deliver power and/or energy, as described in further detail below. At least an energy source 108 may be able to support landing according to a given landing protocol during a partial state of charge (PSOC) but this ability may depend on demands required for the landing protocol. Vehicle or aircraft landing power needs may exceed measured power consumption at any particular time in flight. Determining the power output capability may include comparing at least an electrical parameter to a curve representing a projected evolution over time of at least an energy source 108. In an embodiment, SOC vs time may be used to determine the power and energy outputs of the energy source and may represent the available battery capacity. In an embodiment, at least an energy source 108 consists of a plurality of battery cells. SOC may be impacted by the chemistry type and footprint which can affect the charge and discharge rates and the operational range over time. SOC may also be impacted by any component of the system including wiring, conduit, housing or any other hardware which may cause resistance during use. Cycle life of at least an energy source 108 will also be affected by the number of charge and discharge cycles completed in operation. Capability of at least an energy source 108 to store energy may decrease after several iterations of the charge/discharge cycle over its lifetime.

Still referring to FIG. 9, at least an energy source 108 may include a plurality of energy sources connected in series. For instance, energy source 108 may include a set of batteries and/or cells connected in series to achieve a particular voltage, or the like. Determining power output capability of at least an energy source 108 may include determining a plurality of component energy capabilities representing the energy capabilities of each energy source of the plurality of energy sources, identifying a lowest component energy capability of the plurality of component energy capabilities, and determining the delivery capability of the at least an energy source as a function of the lowest component energy capability. For instance, and without limitation, one cell or battery connected in series with at least another cell or battery may have a lower SOC, or otherwise be able to produce less total energy and/or power than the at least another battery or cell; as a result, at least an energy source 108 overall may be limited primarily by the cell or battery with lower SOC, making the effective power output capability overall dependent on the power output capability of the cell or battery with the lowest SOC, SOV, and/or other measure of power output capability.

With continued reference to FIG. 9, in some embodiments step 915 additionally includes vehicle controller 112 calculating at least a power demand of the plurality of propulsors 104a-n as a function of the initial power levels. At least a power demand may be calculated as any consumption need of any propulsor of plurality of propulsors. For instance, and without limitation, vehicle controller 112 may calculate an at least a potential demand of one or more propulsors of plurality of propulsors. At least a power demand of the plurality of propulsors 104a-n may include a power demand of a propulsor of plurality of propulsors 104a-n. A power demand of a propulsor may include an immediate power demand; an immediate power demand may include or be an initial power level of a propulsor as described above and/or a subsequently calculated power level derived by similar a similar process. An immediate power demand may be calculated by aggregating two or more initial power levels; for instance, the immediate power demand may be calculated by aggregating initial power levels and/or subsequently calculated power levels of all propulsors drawing power from an energy source of at least an energy source 108. A power demand of a propulsor may be calculated as a total amount of power and/or energy projected to be needed to perform a flight maneuver, which may include a flight maneuver for which a current attitude of an electric aircraft 300 incorporating system 100 is to be maintained. For instance, a given propulsor or set of propulsors may be required to maintain initial power level and/or levels for some number of seconds to complete a maneuver such as a landing, a takeoff, a climbing maneuver, a hovering maneuver, or the like, and power demand may be computed by determining an amount of energy needed to remain at initial power level for that number of seconds. As a further example, an overall maneuver may require that power level be increased, decreased, or modified otherwise in response to maneuver instructions and/or conditions; at least a power demand may include power demand calculated as a function of such future needs. At least a power demand may be modified, updated, and/or recalculated using sensor feedback, which may be acquired and applied according to any method described above for use of sensor feedback to determine initial power levels. At least a power demand may include a plurality of power demands; plurality of power demands may include a power demand of each propulsor, a power demand to be drawn from each energy source, an aggregated total power demand of all propulsors and/or any other suitable power demands calculated as described in this disclosure.

Still referring to FIG. 1, calculation of at least a power demand may be accomplished using lookup tables or mathematical relations as described above; for instance, vehicle controller 112 may retrieve from a lookup table a potential level necessary to drive a propulsor at a given velocity, with a given back EMF such as a back EMF derived using models of at least a thrust element 212 and/or motor 200 as described above, or using a mathematical relation such as an equation relating potential demand of a propulsor as a function of desired propulsor velocity and/or back ElVlF, and/or potential and/or power level needed to drive the propulsor at such levels per unit of time, or over a period of time. Persons skilled in the art, upon reviewing the entirety of this disclosure, will be aware of various alternative means for determining a potential demand of a propulsor as described herein. Vehicle controller 112 may perform interpolation, regression, and/or other data analysis or machine learning to predict likely potential power consumption and/or other power demand parameters at an angular speed and/or torque not specifically recorded. Persons skilled in the art, upon reviewing the entirety of this disclosure, will be aware of various ways in which sensor feedback and calculation may be combined consistently with this disclosure to determine potential and/or power consumption needs of a propulsor and/or plurality of propulsors.

Still viewing FIG. 9, at step 920 vehicle controller 112 determines that present power output capability is insufficient to match at least a power demand. In an embodiment, vehicle controller may compare one or more numbers representing present power output capability to one or more numbers representing at least a power demand. For instance, and without limitation, vehicle controller 112 may determine a maximal power output that an energy source of at least an energy source 108 is able to produce and compare the maximal power output to an initial power level and/or anticipated peak power level and/or an aggregation of initial power levels and/or peak power levels of one or more propulsors of plurality of propulsors 104a-n. As a further example, a power demand of one or more propulsors needed to perform a maneuver or maintain an attitude for a desired period of time may be compared to an amount of available energy estimated to be stored in at least an energy source 108 as determined based on and/or using SOC, SOV, other factors or parameters, and/or a combination thereof; estimated available energy may be determined based on total energy available in an energy source 108 and/or based on energy available for a given maneuver or phase of flight, for instance based on data representing an additional amount of energy that will be needed for future maneuvers, such as landing or other later phases of flight. Comparison may include comparison of multiple factors; for instance, comparison may include both a comparison of maximal power output ability of an energy source to an initial and/or peak power level as described above combined with a comparison of estimated available energy and/or available energy for a maneuver, and determination that either maximal output or estimated available energy is insufficient may lead to or serve as a determination that present power output capability is insufficient to match the at least a power demand. A comparison may include a direct comparison, such that, for instance if a number representing at least a power demand is greater than a corresponding number representing a present power output capability, vehicle controller 112 may determine that the present power output capability is insufficient to match the at least a power demand; alternatively or additionally, a comparison may include comparison to a number representing at least a power demand added to a buffer amount, which may represent an amount of reserve or emergency power required to be available to electric aircraft 300 and/or from at least an energy source 108. Reserve may, for instance, include an additional maximal power output amount of at least an energy source 108, a reserve energy storage amount available for unexpectedly difficult conditions, diversion to a different landing zone, or delays in landing due to air traffic or other conditions at a landing site. Comparison involving a buffer and direct comparison may each be used; for instance, at one moment in a flight comparison may be performed with buffers, while at a later moment, for instance under emergent conditions, comparison may include a direct comparison.

With continued reference to FIG. 1, determination may include determination that a single energy source of at least an energy source 108 does not have sufficient current power output capacity to match a power demand corresponding to the single energy source; as a non-limiting example, one propulsor or set of propulsors may need to output more thrust or consume more power to maintain aircraft 300 in a particular attitude as required or instructed by a maneuver to be performed by aircraft 300, for instance as directed by vehicle controller 112, which may result in an energy source associated with that propulsor having insufficient maximal power output or insufficient stored energy to supply that propulsor. Continuing the above example, in existing systems a result may be that the associated energy source is depleted faster than other sources, causing the propulsor from which maximal power output is needed for attitude control to fail first, leading to increasingly unstable and energy inefficient flight; this may cause accidents or failure to complete flight plans. The above-described exemplary situation may be detected as part of determination that present power output capability is insufficient to match at least a power demand.

Alternatively or additionally, and continuing to refer to FIG. 1, power insufficiency may be determined by other means, such as by a recursive method, a machine learning model, or by reference to another model, formula, or mathematical relationship. Sensor feedback may also contribute to determination of power insufficiently; for instance, vehicle controller may issue commands to one or more propulsors of plurality of propulsors at initial power levels, receive feedback from one or more sensors indicating that an amount of less than the initial power level is being consumed by one or more propulsors, and determine as a result that a power insufficiency exits. Propulsor feedback may be used, in an embodiment, to determine each propulsor's ability to reach a commanded torque, speed, and/or power point commanded by controller 112; a short-fall at a propulsor may be determined, without limitation, by measuring back-EMF as described above. A short-fall at each propulsor may be communicated back to the vehicle controller which will then distribute the shortfall among all propulsors. This may be repeated in a recursive fashion, for instance by producing a reduced power level for one or more of the plurality of propulsors as described below, then repeating any stage of this method 900 with the reduced power level as a new initial power level. Persons skilled in the art will be aware, upon reviewing the entirety of this disclosure, of various ways to determine that present power output capability of at least an energy source is insufficient at initial power level.

Still referring to FIG. 1, and as an illustrative example, vehicle controller 112 may determine that electric potential is insufficient to match aggregate demand. This may be performed, for instance, by a quantitative comparison; in an embodiment, where electric potential is less than or equal to aggregate potential demand, vehicle controller 112 determines that electric potential is insufficient to meet aggregate potential demand. Alternatively, vehicle controller 112 may be designed and configured to require that electric potential exceed aggregate potential demand by some quantity as a buffer; quantity may be selected, for instance, to permit electric potential of at least an energy source 108 to decrease with a decreasing state of charge, which may be predicted based on flight plan or other data concerning likely future energy demands. Quantity may be selected as a reserve against unforeseen conditions, such as a need to reroute around obstacles or weather or as directed by air traffic control, a need to expend more power to maintain attitude or stability during unexpectedly turbulent conditions, or the like. Quantity may include a combination of the above amounts. Vehicle controller 112 may determine that electric potential is insufficient to match aggregate potential demand unless electric potential exceeds aggregate potential demand by at least quantity.

At step 925, and with continued reference to FIG. 9, vehicle controller 112 may generate a reduced power level less than the initial power level for each propulsor of plurality of propulsors 104a-n. Reduced power level may be calculated, as a non-limiting example, by calculating a proportional reduction factor and multiplying each initial power level of the plurality of initial power levels by the reduction factor. Potential reduction factor may be calculated once for all propulsors of plurality of propulsors 104a-n; this may act to ensure that all propulsors of plurality of propulsors 104a-n have their power levels reduced by the same proportion of their initial power levels, preserving relative power outputs of plurality of propulsors 104a-n. In an embodiment, maintaining relative power outputs may ensure that attitude control is maintained according to initial navigational and/or propulsion goals as determined by vehicle controller 112 above. Reduction factor may be calculated as a function of a power consumption need of a propulsor of plurality of propulsors 104a-n having the greatest power consumption need of the plurality of propulsors 104a-n, as determined, for instance, using back ElVlF estimated for that propulsor at initial power level. This may be determined by comparing any parameter of detected and/or calculated power consumption needs and/or initial power levels for plurality of propulsors and comparison of parameters to each other; for instance, and without limitation, determining maximal power consumption may include comparing one or more numbers describing at least a power demand of each propulsor to each other propulsor and determining a maximum number of the one or more numbers. As a further non-limiting example, determining maximal power consumption may include determining back electromotive force for each propulsor of the plurality of propulsors 104a-n and identifying the maximal back electromotive force. Back electromotive force may be estimated as a function of initial power level as described above. Back EMF may alternatively be computed and/or estimated as function of the electric motor's magnet strength, and the rotational speed of the motor. Reduction factor may be calculated as a function of electric potential of at least an energy source 108 under load. Reduction factor may be calculated as a function of aggregate potential demand. Calculation of reduction factor may combine the above-described elements. As a non-limiting example, where back EMF and/or propulsor power are estimated, reduction factor may be calculated using the formula: Reduction factor=(highest back ElVIF estimate/Energy Source potential under load)*weighting factor; weighting factor may be calculated as weighting factor=highest Back ElVIF propulsor power/total energy source power. Estimation of back-EMF may be performed by linking desired torque to desired propulsor speed via a propulsor characteristic, which may be stored in memory of controller, e.g., as a value, set of equations, table of values, and/or model, and then using desired speed to estimate desired back EMF, estimated desired back ElVIF may also be used to estimate battery potential ratio. Persons skilled in the art will be aware, upon review of the entirety of this disclosure, of various other ways in which reduction factor may be calculated or derived. Where two or more propulsors are determined to be demanding too much power for the capabilities of the at least an energy source 108, reduction factor may be selected by calculating a plurality of reduction factors including a reduction factor for each propulsor of the plurality of propulsors and selecting a maximal reduction factor of the plurality of reduction factors as the reduction factor to be used. Reduction factor may be computed per energy source of at least an energy source 108; for instance, any of the above methods for calculation of a reduction factor may be performed regarding each propulsor driven by a given energy source and aggregated to derive a total reduction factor for that energy source, which may ensure that reduction factor is sufficient to bring power consumption within the present capabilities of that energy source. Aggregation may include any suitable form of aggregation that may occur to persons skilled in the art, upon reviewing the entirety of this disclosure, including without limitation adding together propulsors' reduction factors to derive a total reduction factor per energy source. A maximal reduction factor of a plurality of reduction factors calculated for sets of propulsors driven by shared energy sources may be selected as above, to determine the overall reduction factor for all propulsors.

Still viewing FIG. 9, and at step 930, vehicle controller 112 directs, for each reduced power level, a corresponding propulsor of the plurality of propulsors 104a-n to consume electrical power at the reduced power level; the corresponding propulsor, as used herein, is the propulsor that vehicle controller 112 was going to command to consume power at an initial power level that was reduced to reduced power level. For instance, where reduced power level was derived by multiplying an initial power level intended for a particular propulsor by a reduction factor as described above, vehicle controller 112 may direct that propulsor to consume reduced power level. In an embodiment, propulsors so directed consume a power at a level that may be output by at least an energy source 108, and thus at a level that may be sustained for some time, albeit potentially while losing altitude or effecting an emergency landing; where all reduced power levels are reduced in proportional measure, for instance using reduction factor as described above, relative propulsive outputs may be similar to relative propulsive outputs at initial power levels, enabling similar attitude control to that initially computed to be maintained. As a result, a safer emergency landing or extended flight at a lower speed and/or altitude may be possible. In an embodiment, relative power levels being maintained during overall reduction may allow a current or desired attitude of an aircraft 300 to be maintained, which may permit continued flight, controlled landing such as emergency landing, or the like.

Still viewing FIG. 9, in a non-limiting example presented for illustrative purposes only and corresponding to an embodiment of "Case A" as described above, a gap in power capability may be estimated with regard to an energy source having insufficient power output capability. This may be performed, as a non-limiting example, by estimating the impact on affected propulsors; estimation may be, for instance, calculated using the equation: Power Gap=Total Power Desired−Estimated Power Capability of all the propulsors for the given energy source potential. Total power desired may be estimated by way of the attitude control for each propulsor under ideal conditions where the energy storage is able to supply sufficient voltage/potential with no constraints on the propulsors. Energy storage potential may be estimated according to any method described above for such estimation, including using observed or estimated open circuit potential and internal series resistance characteristics for at least an energy source 108. A resulting energy source terminal potential's impact (or power limit impact) on corresponding propulsors may be estimated and reductions in any of the propulsors may be noted; an actual power capability and/or performance of energy source may be derived from the above-described elements. A shortfall between desired and actual capability and/or performance may be noted and used to calculate a percentage of the original desired power level representing the shortfall; all propulsors may be reduced by this percentage, so as to maintain the relative power between the thrusters for the purposes of attitude control. Alternatively or additionally, a solver may be applied to the problem, or some other recursive routine to arrive at the power gap or percentage of shortfall between desired and actual performance. Percentage shortfall may then be applied to propulsor commands as described above, such that the relative power distribution between the propulsors is maintained. Such modified propulsor commands may have a lower average power level to help prevent any one propulsor from underperforming relative to the others. This may result in a vehicle which still obeys the attitude control intention of flight controller and/or of a pilot, or performs within some reasonable tolerance thereof, preventing or alleviating harm resulting from underperforming energy sources.

Still viewing FIG. 9, in another exemplary case corresponding to "Case B" as described above, where all propulsors are affected by the battery's limited power capability, a gap in power provision ability between the aggregate demand as calculated above and the present power output capability of at least an energy source may be estimated; as a non-limiting example, a gap in power provision ability may be estimated as total power desired minus estimated battery power capability, where total power desired is estimated by way of the attitude control for each propulsor under ideal conditions where the energy storage is able to supply sufficient voltage/potential, assuming at least an energy source is able to produce as much power as is needed, and energy storage maximum power capability is estimated by the observed (e.g. using one or more sensors) or estimated open circuit potential and internal series resistance characteristics for the battery and the minimum allowable potential for safe operation. Further continuing the example, the shortfall between desired and actual power performance may be noted and made into a percentage of the original desired power level; all propulsors may be reduced by this percentage, so as to maintain the relative power between plurality of propulsors 104a-n for the purposes of attitude control.

With continued reference to FIG. 9, as a person skilled in the art will be aware upon reviewing the entirety of this disclosure, each of power delivery capability, ability to provide electric potential, ability to drive torque at a required level, and/or ability to achieve a target propeller thrust and/or speed may be mathematically related; thus, for instance, calculation of power delivery capability as described above may be performed by calculation of any of the other values, and vice-versa. For the purposes of this disclosure, and unless otherwise specified, determination of ability of at least an electrical energy source 108 to provide torque, speed, potential and/or power is also a determination of each other ability.

Embodiments of the above-described system and methods advantageously enable an electronic aircraft having reduced power capacity to operate at reduced power levels while maintaining a desired and/or necessary attitude control. For example, an aircraft that is performing a hovering landing while lacking energy reserves to complete the landing may reduce thrust, resulting in, for instance, a more rapid descent or less hovering time, while preventing more problematic outcomes that may result from loss of attitude control, such as flipping over, drifting away from a landing site, collision with other buildings or vehicles, or the like. Cascading propulsor failures may be prevented by overall power reductions based on the most at-risk propulsor.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods as described above. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for maintaining attitude control under degraded or depleted energy source conditions using multiple electric propulsors, the system comprising:
   a plurality of propulsors;
   at least an energy source providing electric power to the plurality of propulsors; and a vehicle controller communicatively coupled to each propulsor of the plurality of propulsors, the vehicle controller designed and configured to:
   determine commands for the plurality of propulsors, the commands include a command for each propulsor of the plurality of propulsors;
   calculate initial power levels for the plurality of propulsors as a function of the commands, the initial power levels including an initial power level for each propulsor of the plurality of propulsors;
   detect a present power output capability of the at least an energy source;
   determine that the present power output capability is insufficient to match the initial power levels; and
   for each initial power level of the plurality of initial power levels:
   generate a reduced power level, the reduced power level less than the initial power level; and
   direct a corresponding propulsor of the plurality of propulsors to consume electrical power at the reduced power level.

2. The system of claim 1, wherein calculation of initial power levels further comprises calculation of initial power levels based on an attitude control goal.

3. The system of claim 1, wherein detecting the present power output capability of the at least an energy source further comprises detecting, by the vehicle controller, an electric potential of the least an energy source under load.

4. The system of claim 1, wherein generating the reduced power level further comprises: calculating a proportional reduction factor; and
   multiplying the initial power level by the reduction factor.

5. The system of claim 4 wherein calculating the proportional reduction factor further comprises:
   identifying a propulsor, of the plurality of propulsors, requiring a maximal power consumption; and
   calculating the proportional reduction factor as a function of the maximal power consumption.

6. The system of claim 5, wherein identifying the propulsor further comprises:

determining back electromotive force for each propulsor of the plurality of propulsors; and identifying the maximal back electromotive force.

7. The system of claim 6, wherein determining back electromotive force further comprises estimating back electromotive force as a function of the initial power level.

8. The system of claim 6, wherein determining back electromotive force further comprises estimating back electromotive force as a function of a computer model of the propulsor.

9. The system of claim 1, wherein determining the commands further comprises determining the commands as a function of an autonomous function.

10. The system of claim 1, wherein determining the commands further comprises receiving the commands from a remote device.

11. A method of maintaining attitude control of an electronic multi-propulsion system under degraded energy source conditions, the method comprising:
    determining, by a vehicle controller communicatively connected to a plurality of propulsors powered by at least an energy source, commands for the plurality of propulsors, the commands including a command for each propulsor of the plurality of propulsors;
    calculating, by the vehicle controller, initial power levels for the plurality of propulsors as a function of the commands, the initial power levels including an initial power level for each propulsor of the plurality of propulsors;
    detecting, by the vehicle controller, a present power output capability of the at least an energy source;
    determining, by the vehicle controller, that the present power output capability is insufficient to match the initial power levels; and
    for each initial power level of the plurality of initial power levels:
    generating, by the vehicle controller, a reduced power level, the reduced power level less than the initial power level; and
    directing, by the vehicle controller, a corresponding propulsor of the plurality of propulsors to consume electrical power at the reduced power level.

12. The method of claim 11, wherein calculation of initial power levels further comprises calculation of initial power levels based on an attitude control goal.

13. The method of claim 11, wherein determining the present power output capability of the at least an energy source further comprises determining, by the vehicle controller, an electric potential of the least an energy source under load.

14. The method of claim 11, wherein generating the reduced power level further comprises: calculating a proportional reduction factor; and multiplying the initial power level by the reduction factor.

15. The method of claim 14, wherein calculating the proportional reduction factor further comprises:
    identifying a propulsor, of the plurality of propulsors, requiring a maximal power consumption; and
    calculating the proportional reduction factor as a function of the maximal power consumption.

16. The method of claim 15, wherein identifying the propulsor further comprises:
    determining back electromotive force for each propulsor of the plurality of propulsors; and identifying the maximal back electromotive force.

17. The method of claim 16, wherein determining back electromotive force further comprises estimating back electromotive force as a function of the initial power level.

18. The method of claim 16, wherein determining back electromotive force further comprises estimating back electromotive force as a function of a computer model of the propulsor.

19. The method of claim 11, wherein determining the commands further comprises determining the commands as a function of an autonomous function.

20. The method of claim 11, wherein determining the commands further comprises receiving the commands from a remote device.

* * * * *